D. CAMERON.
RESILIENT WHEEL.
APPLICATION FILED JAN. 24, 1919.

1,297,791.

Patented Mar. 18, 1919.
2 SHEETS—SHEET 1.

Inventor,
Duncan Cameron
By
Attorney

D. CAMERON.
RESILIENT WHEEL.
APPLICATION FILED JAN. 24, 1919.

1,297,791.

Patented Mar. 18, 1919.
2 SHEETS—SHEET 2.

Inventor,
Duncan Cameron
By
Attorney.

UNITED STATES PATENT OFFICE.

DUNCAN CAMERON, OF DETROIT, MICHIGAN.

RESILIENT WHEEL.

1,297,791.    Specification of Letters Patent.    Patented Mar. 18, 1919.

Application filed January 24, 1919.  Serial No. 272,920.

*To all whom it may concern:*

Be it known that I, DUNCAN CAMERON, a citizen of the United States, residing at Detroit, in the county of Wayne and State of Michigan, have invented certain new and useful Improvements in Resilient Wheels, of which the following is a specification.

This invention relates to resilient wheels of that type having curved spring spokes extending between the hub and the felly, and its object is to provide a novel and improved connection between the hub and the inner ends of the spokes having certain advantages to be pointed out in detail hereinafter.

In order that the invention may be better understood, reference is had to the accompanying drawings forming a part of this specification, and in said drawings—

Figure 1:
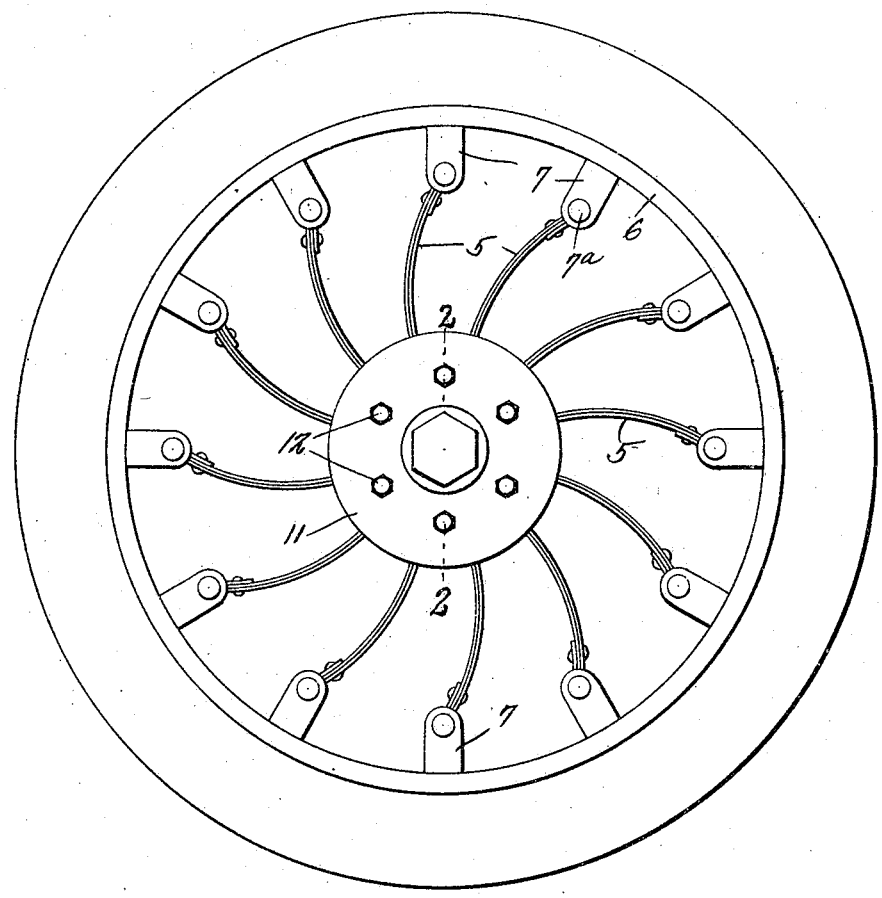
Figures 2, 3:
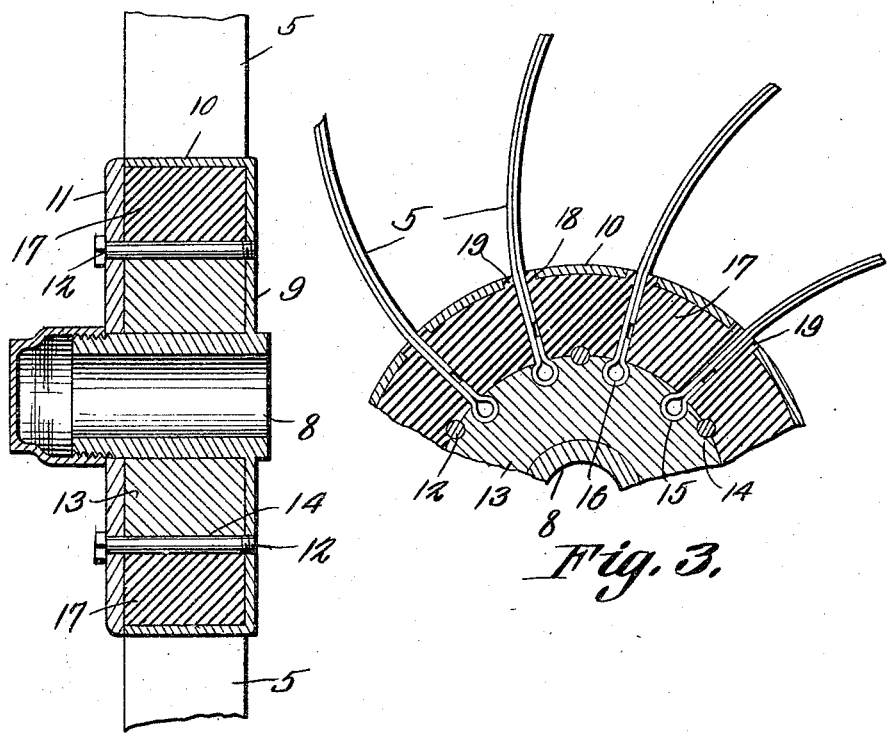
Figure 4:
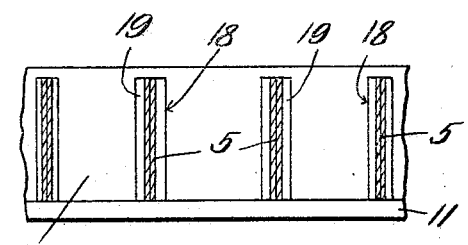

Figure 1 is an elevation of the wheel; Fig. 2 is an enlarged cross-section on the line 2—2 of Fig. 1; Fig. 3 is a longitudinal section of a fragment of the hub, and Fig. 4 is a plan view of a fragment of the hub, with the spokes shown in section.

Referring specifically to the drawings, 5 denotes the curved spring spokes which extend between the hub and the felly of the wheel, their outer ends being connected to the felly 6 by clips 7 and bolts 7ª. These spokes are disclosed in detail and claimed in an application filed May 31, 1918, Serial No. 237491, and the subject matter of the present application relates more particularly to the connection between the hub and the inner ends of the spokes, which will now be described.

The hub of the wheel has a body portion 8 provided with the usual outstanding circular flange 9 which has a laterally extending peripheral or marginal flange 10 spaced from and overhanging the hub body. On the hub body 8 is also mounted a circular plate 11 of such diameter that it abuts against the edge of the flange 10, and is thus spaced from the flange 9 a distance equal to the width of the flange 10. The plate is secured to the flange 9 by cap screws 12, or other suitable means.

On the hub body 8, between the flange 9 and the opposite plate 11, is mounted a circular block 13 to which the spokes 5 are anchored at their inner ends. This block has a central opening so that it may be slipped over the hub body 8, and it is prevented from turning on the latter by the screws 12, the block having peripheral seats 14 for the screws.

The hub block 13 has peripheral recesses 15 in which eyes 16 at the inner ends of the spokes 5 seat. These recesses open through the sides of the block, and the spokes are inserted and removed edgewise, this being readily done after the plate 11 is taken off.

The dimension of the block 13, radially, is such that it does not reach the flange 10, leaving a space between the latter and the periphery of the block. This space is filled with cushion blocks 17 of rubber or other compressible material, there being a cushion block between each two adjacent spokes 5. The flange 10 has slots 18 through which the spokes pass, and the width of these slots is slightly greater than the thickness of the spokes, this being for the purpose of allowing the spokes a slight movement back and forth in the slots when they are in action and being flexed. The flange 10 therefore does not rigidly clamp the spokes at their inner ends, and they have sufficient freedom of movement under flexure to prevent breakage, there being no bending stresses in the spokes where they pass the flange. If the spokes were rigidly clamped on opposite sides, the bending back and forth at this point will eventually result in a break. The rubber blocks 17 have reduced peripheral portions 19 which seat in the slots 18 and serve to prevent a metal-to-metal contact between the sides of the spokes and the walls of the slots, which further reduces the liability of breakage. The rubber in the slots does not interfere with the hereinbefore described movement of the spokes back and forth in the slots, as it is compressible. The portions of the spokes between the hub block 13 and the flange 10 seat snugly between the blocks 17, and as the latter are compressible, these portions of the spokes are also yieldingly held. The liability of breakage of the spokes at their inner ends is therefore reduced to a minimum, as they are yieldingly secured at these ends, and their movement when under flexure is cushioned.

I claim:

1. In a wheel, curved resilient spokes extending between the hub and the felly, the hub comprising a body having an outstanding flange provided with a laterally presented marginal flange having slots, a plate seating on the hub body and abutting against the marginal flange and spaced thereby from the first-mentioned flange, means for fastening the plate, a block seating on the hub body between the first-mentioned flange and the plate, said block being inside the second-mentioned flange and spaced therefrom, means for anchoring the inner ends of the spokes to the block, said spokes passing through the aforesaid slots, and cushion blocks between those portions of the spokes which are located between the first-mentioned block and the marginal flange.

2. In a wheel, curved resilient spokes extending between the hub and the felly, the hub comprising a body having an outstanding flange provided with a laterally presented marginal flange, a plate seating on the hub body and abutting against the marginal flange and spaced thereby from the first-mentioned flange, means for fastening the plate, a block seating on the hub body between the first-mentioned flange and the plate, said block being inside the second-mentioned flange and spaced therefrom, means for anchoring the inner ends of the spokes to the block, the marginal flange having slots through which the spokes pass, the width of said slots being greater than the thickness of the spokes to permit the lateral play of the latter in the slots, and cushion blocks between those portions of the spokes which are located between the first-mentioned block and the marginal flange.

3. In a wheel, curved resilient spokes extending between the hub and the felly, the hug comprising a body having an outstanding flange provided with a laterally presented marginal flange, a plate seating on the hub body and abutting against the marginal flange and spaced thereby from the first-mentioned flange, means for fastening the plate, a block seating on the hub body between the first-mentioned flange and the plate, said block being inside the marginal flange and spaced therefrom, means for anchoring the inner ends of the spokes to the block, the marginal flange having slots through which the spokes pass, the width of said slots being greater than the thickness of the spokes, and cushion blocks between those portions of the spokes which are located between the first-mentioned block and the marginal flange, said cushion blocks having projecting portions seating in the slots.

In testimony whereof I affix my signature.

DUNCAN CAMERON.

Copies of this patent may be obtained for five cents each, by addressing the "Commissioner of Patents, Washington, D. C."